United States Patent [19]
Meyer

[11] Patent Number: 5,819,428
[45] Date of Patent: Oct. 13, 1998

[54] EXTENSOMETER STRUCTURE

[75] Inventor: Richard A. Meyer, Carver, Minn.

[73] Assignee: MTS Systems Corporation, Eden Prairie, Minn.

[21] Appl. No.: 712,078

[22] Filed: Sep. 11, 1996

Related U.S. Application Data

[63] Continuation-in-part of Ser. No. 699,630, Aug. 19, 1996, abandoned.

[51] Int. Cl.⁶ .................................. G01B 7/16; G01B 5/30
[52] U.S. Cl. ................................................. 33/787; 33/790
[58] Field of Search ............................. 33/787, 788, 789, 33/790

[56] References Cited

U.S. PATENT DOCUMENTS

| | | |
|---|---|---|
| 289,203 | 4/1883 | GBX . |
| 1,992,573 | 2/1935 | Hounsfield . |
| 1,999,075 | 4/1935 | Bauer et al. . |
| 2,119,076 | 5/1938 | Dietrich . |
| 2,177,605 | 10/1939 | Whittemore . |
| 2,297,394 | 9/1942 | Dietrich . |
| 2,416,664 | 2/1947 | Ruge . |
| 2,663,085 | 12/1953 | Ruge . |
| 2,681,566 | 6/1954 | Ruge . |
| 2,917,920 | 12/1959 | Robinette, Jr. et al. . |
| 2,941,298 | 6/1960 | Huyser . |
| 3,319,338 | 5/1967 | Nicola . |
| 3,514,864 | 6/1970 | Davidson et al. ........................ 33/787 |
| 3,729,829 | 5/1973 | Lange et al. . |
| 3,789,508 | 2/1974 | Meline ...................................... 33/788 |
| 3,866,473 | 2/1975 | Teitelbaum et al. . |
| 4,093,954 | 6/1978 | Prewitt, Jr. et al. . |
| 4,141,345 | 2/1979 | Allen et al. . |
| 4,223,443 | 9/1980 | Bachmann et al. . |
| 4,249,417 | 2/1981 | Feldstein et al. . |
| 4,294,015 | 10/1981 | Drouin et al. . |
| 4,507,871 | 4/1985 | Meyer et al. .............................. 33/790 |
| 4,841,226 | 6/1989 | Meline et al. ............................. 33/788 |
| 4,899,761 | 2/1990 | Brown et al. . |
| 5,083,465 | 1/1992 | Myers . |
| 5,119,569 | 6/1992 | Meline ...................................... 33/790 |
| 5,123,175 | 6/1992 | van der Kuur . |
| 5,463,902 | 11/1995 | Shrive et al. . |
| 5,600,895 | 2/1997 | Meyer et al. .............................. 33/789 |

OTHER PUBLICATIONS

Y. Hasin et al., "Miniature Force Transducer for Myocardial Stimulation and Local Tension Measurements", *IEEE Transactions on Biomedical Engineering*, vol. BME–26, No. 2, Feb. 1979.

*Primary Examiner*—Christopher W. Fulton
*Attorney, Agent, or Firm*—Westman, Champlin & Kelly, P.A.; S. Koehler

[57] ABSTRACT

An extensometer structure for an extensometer comprises a flexure assembly, a first extension arm and a second extension arm. The flexure assembly includes a first flexure defining a first plane and a second flexure defining a second plane. The second flexure is coupled to the first flexure so that the first and second planes intersect. The first extension arm is joined to the first flexure and has a first tip engageable with a test specimen wherein a line of force from the first tip extends parallel to the first plane. The second extension arm is joined to the second flexure and has a second tip engageable with the test specimen wherein a line of force from the second tip extends parallel to the second plane.

31 Claims, 14 Drawing Sheets

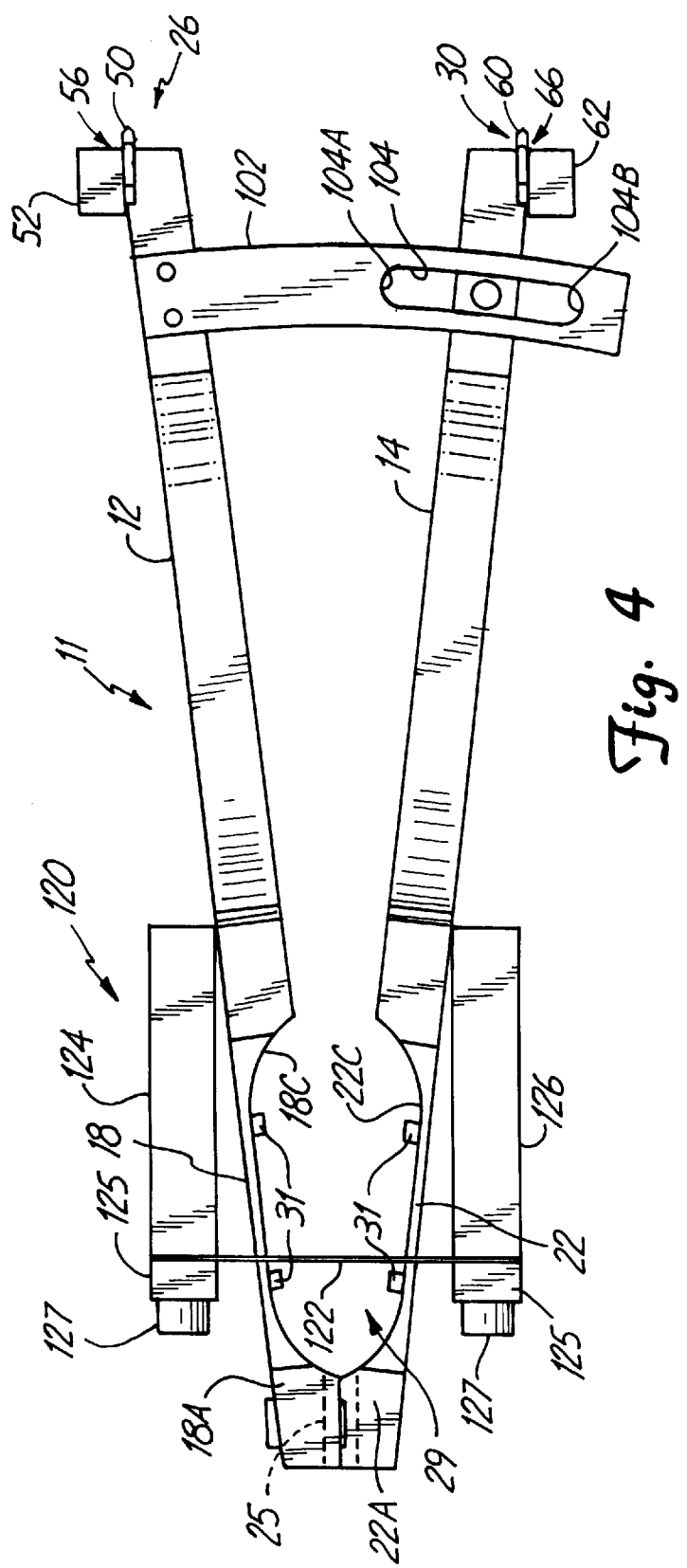

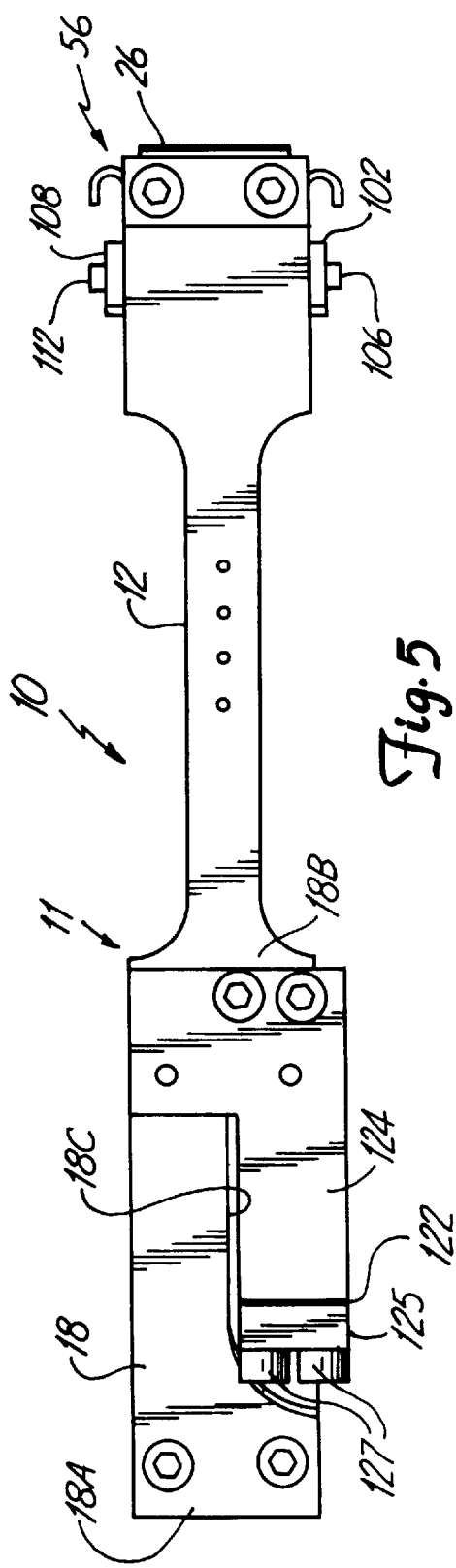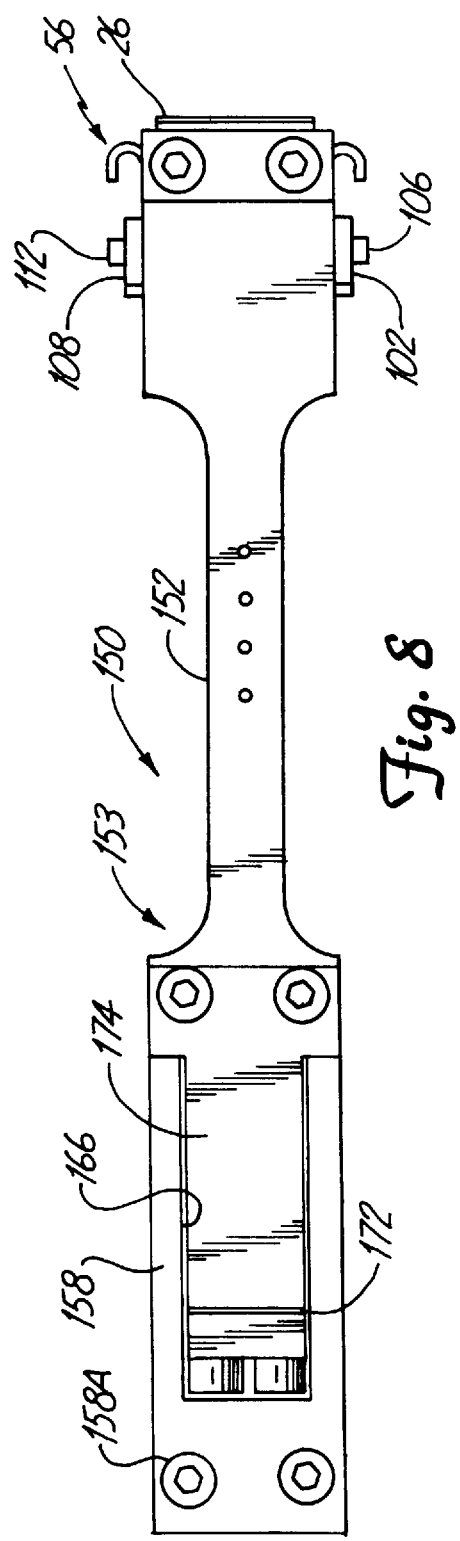

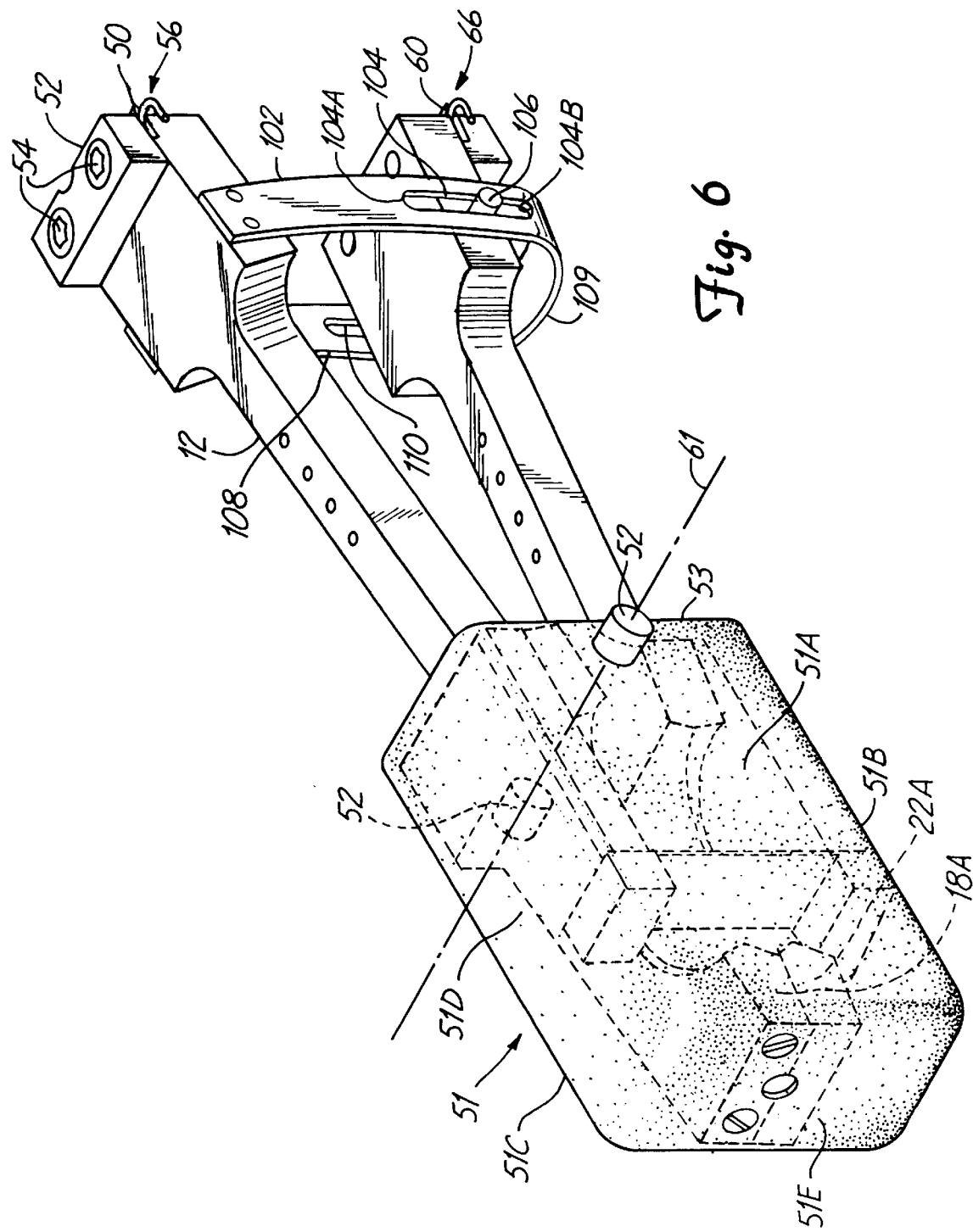

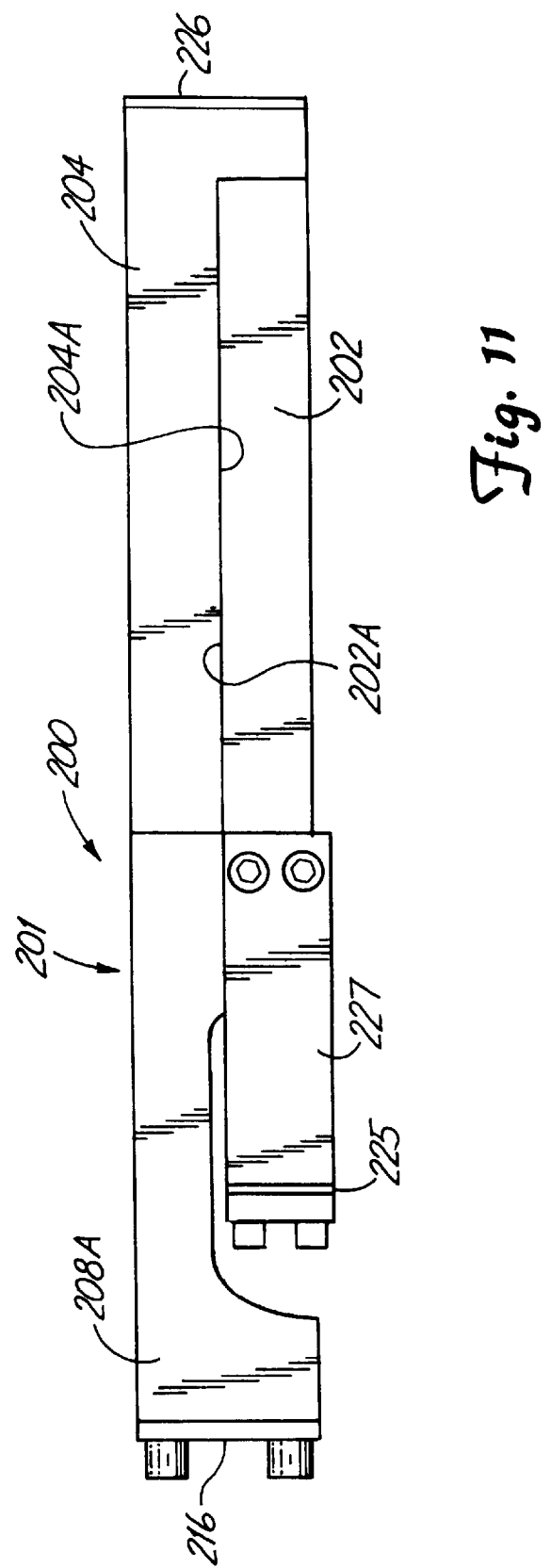

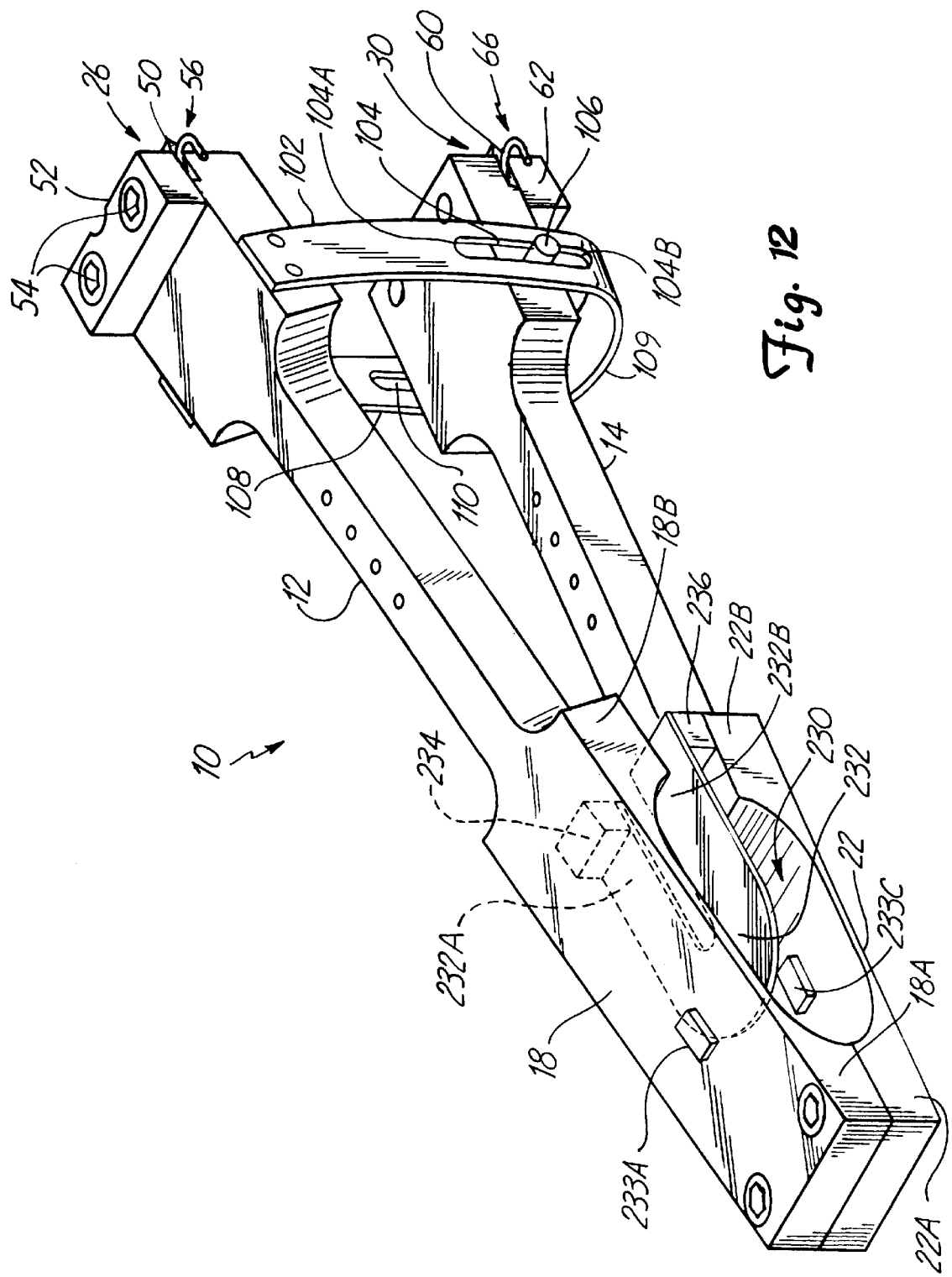

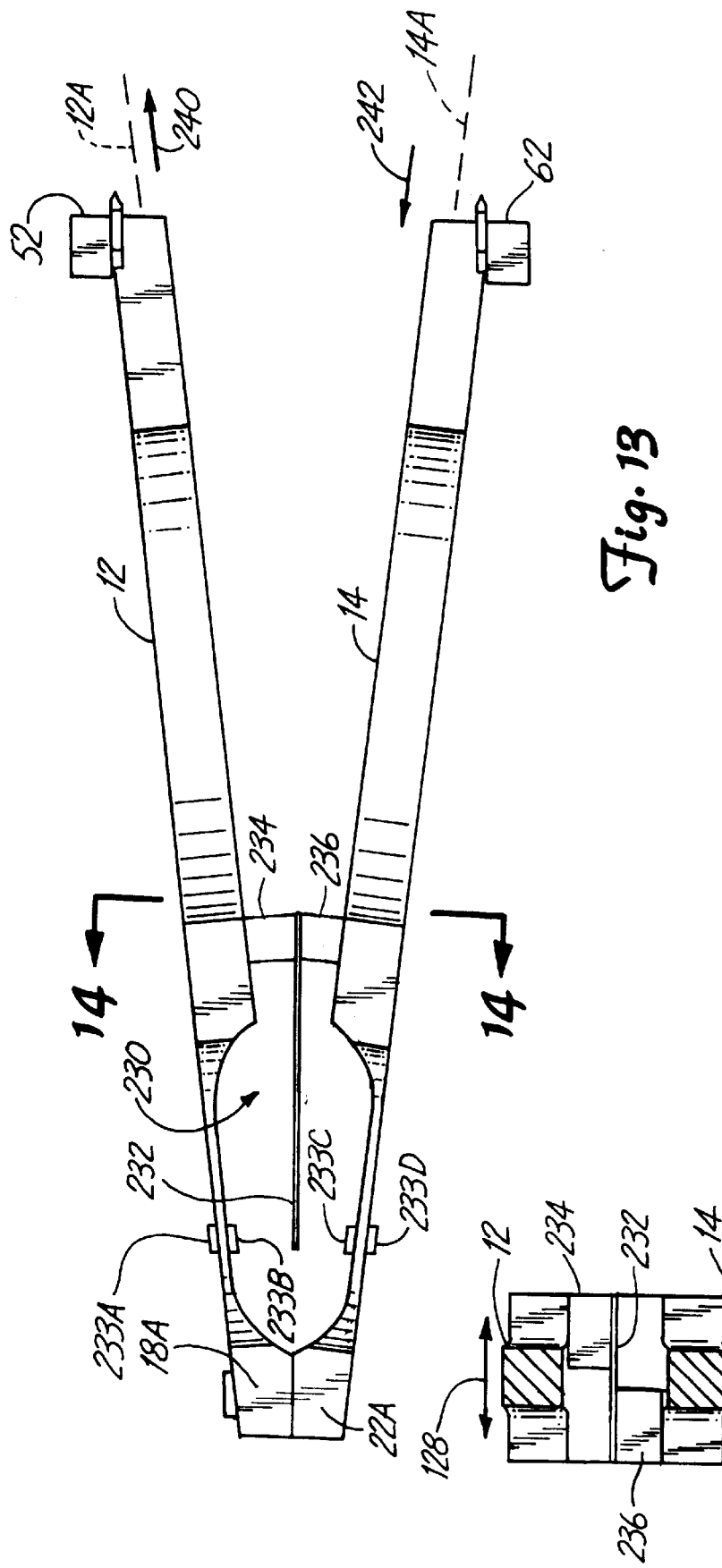

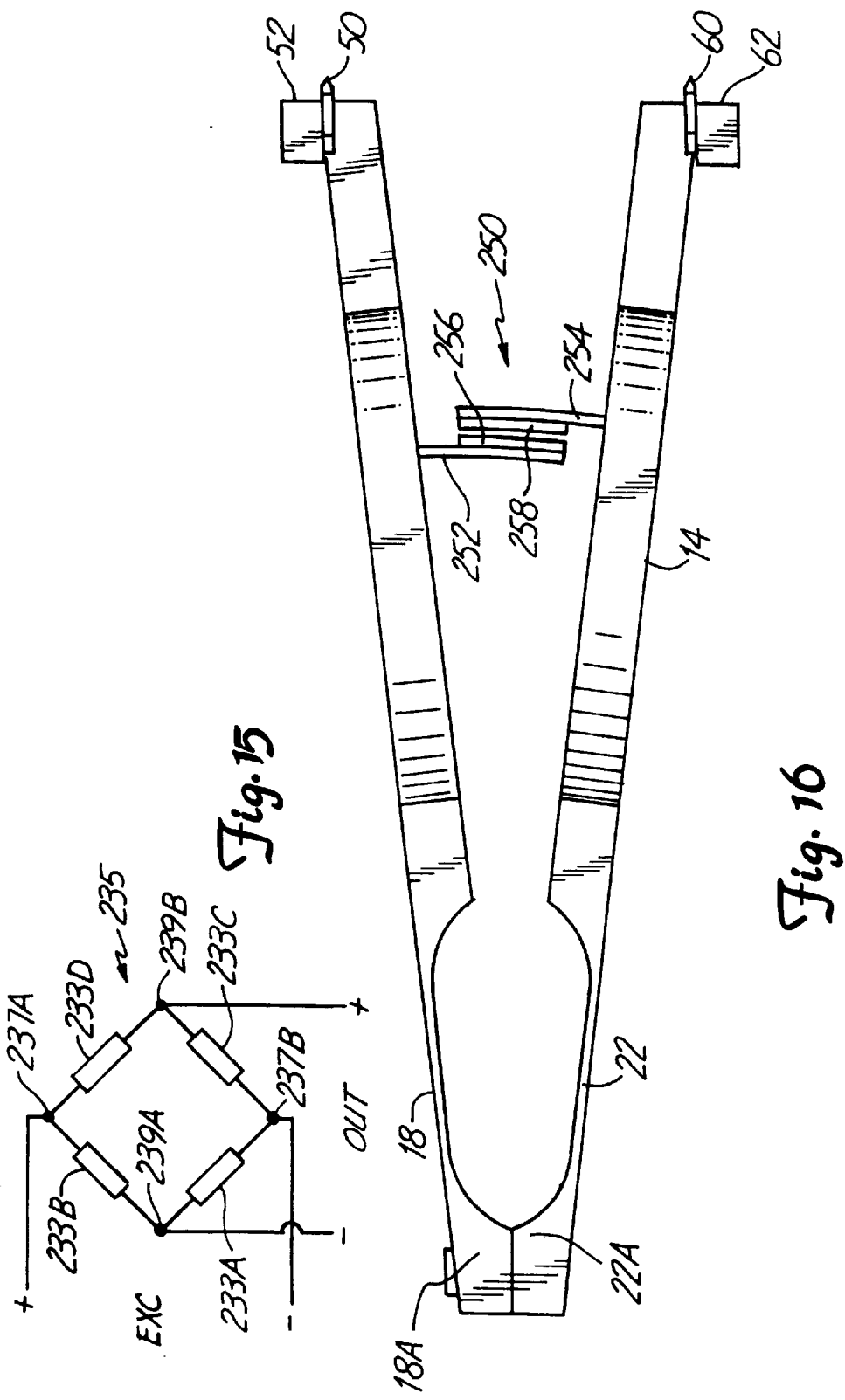

EXTENSOMETER STRUCTURE

CROSS REFERENCE TO RELATED APPLICATION

This application is a continuation in part of application Ser. No. 08/699630, filed Aug. 19, 1996 now abandoned and entitled "EXTENSOMETER".

BACKGROUND OF THE INVENTION

The present invention relates to an extensometer that measures a change in distance. More particularly, the present invention relates to an extensometer having an improved extensometer structure.

Extensometer are commonly used for measuring strain in a test specimen. Numerous forms of extensometer have been advanced in the art. In any extensometer, it is desired that the extension arms move in a direction of the distance to be measured with a very low activation force. In addition, the extensometer must resist forces that could result in inaccurate measurements. For instance, the extension arms should resist any twisting motion as well as lateral forces applied to the arms in opposed directions.

SUMMARY OF THE INVENTION

An extensometer structure for an extensometer comprises a flexure assembly, a first extension arm and a second extension arm. The flexure assembly includes a first flexure defining a first plane and a second flexure defining a second plane. The second flexure is coupled to the first flexure so that the first and second planes intersect. The first extension arm is joined to the first flexure and has a first tip engageable with a test specimen wherein a line of force from the first tip extends parallel to the first plane. The second extension arm is joined to the second flexure and has a second tip engageable with the test specimen wherein a line of force from the second tip extends parallel to the second plane. When a sensing device is operably coupled to the extensometer structure to provide an output signal indicative of the change in distance between the first tip and the second tip, an improved extensometer is formed.

Another aspect of the present invention is a bracing flexure to resist unwanted displacements of the first tip and the second tip. In a first embodiment, the bracing flexure is coupled to the first extension arm and the second extension arm such that the bracing flexure lies in a plane that would intersect with the first plane and the second plane within a length of the first flexure and the second flexure. In a second embodiment, the bracing flexure is disposed between the first extension arm and the second extension arm having ends positioned adjacent to each other. A first end is coupled to the first extension arm, while a second end is coupled to the second extension arm.

Another aspect of the present invention is a stop assembly to prevent overbending of the flexures in the flexure assembly. As applied to the extensometer described above, the stop assembly includes a plate joined to the first extension arm. The plate includes an arcuate slot. A pin is joined to the second extension arm and extends into the arcuate slot.

In a further preferred embodiment, a second plate is joined to the first extension arm on a side opposite the first-mentioned plate. The second plate includes a second arcuate slot. A second pin is joined to the second extension arm and extends into the second arcuate plate.

BRIEF DESCRIPTION OF THE DRAWINGS

FIG. 4 is a side elevational view of the extensometer and the bracing flexure assembly of FIG. 3.

FIG. 5 is a top plan view of the extensometer and the bracing flexure assembly of FIG. 3.

FIG. 6 is a perspective view of the extensometer, the bracing flexure assembly of FIG. 3 and a support housing.

FIG. 8 is a top plan view of the extensometer and the bracing flexure assembly of FIG. 7.

FIG. 11 is a top plan view of the extensometer and the bracing flexure assembly of FIG. 9.

FIG. 12 is a perspective view of a fourth embodiment of a bracing flexure assembly of the present invention secured to the extensometer of FIG. 1.

FIG. 13 is a side elevational view of the extensometer and the bracing flexure assembly of FIG. 11.

FIG. 14 is a sectional view taken along lines 14—14 in FIG. 13.

FIG. 15 is a circuit diagram of a Wheatstone bridge.

FIG. 16 is a side elevational view of the extensometer of FIG. 1 with a capacitive sensor.

DETAILED DESCRIPTION OF THE PREFERRED EMBODIMENTS

Figure 1:
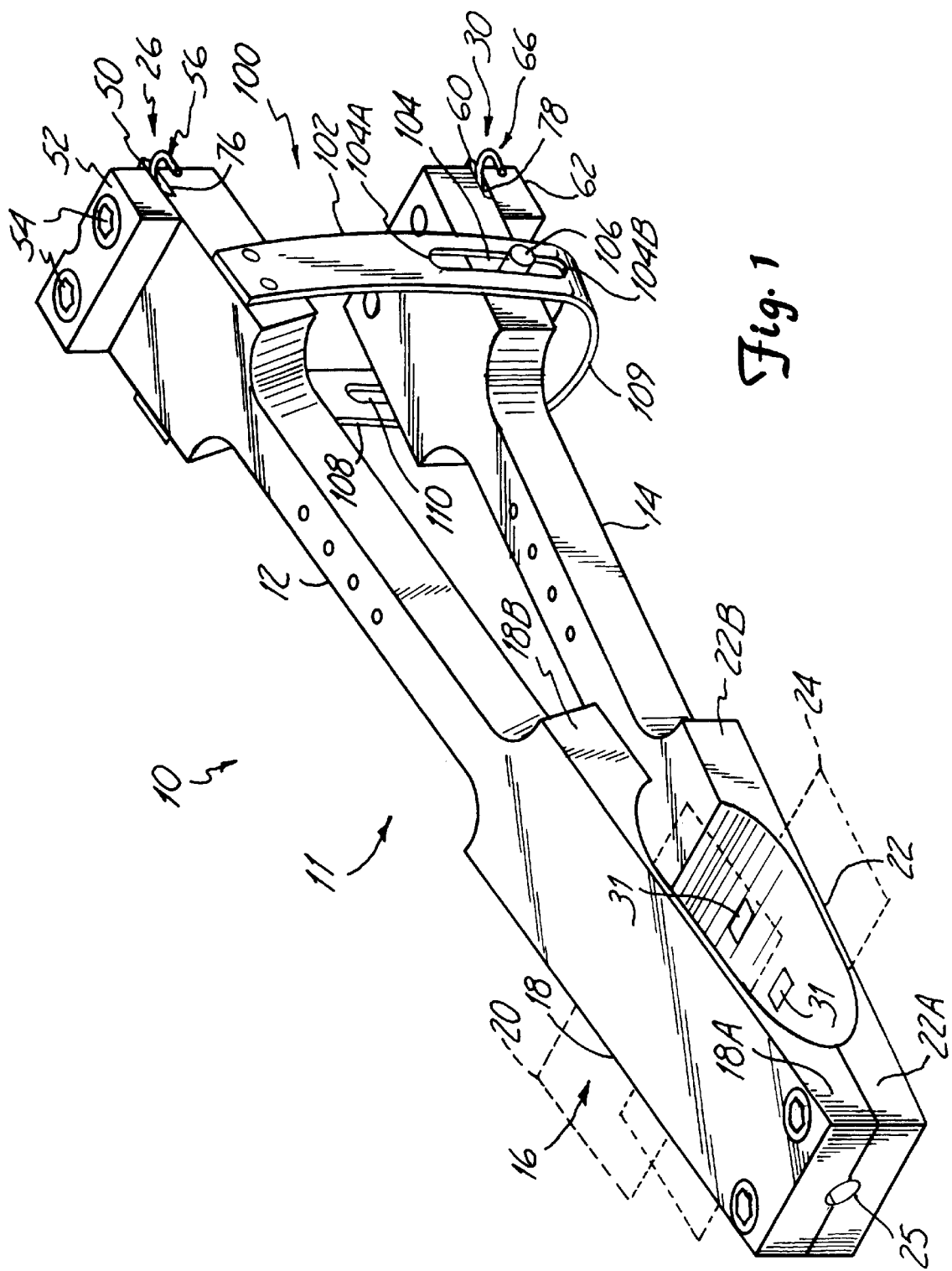
FIG. 1 is a perspective view of a first embodiment of an extensometer of the present invention.
Figure 2:
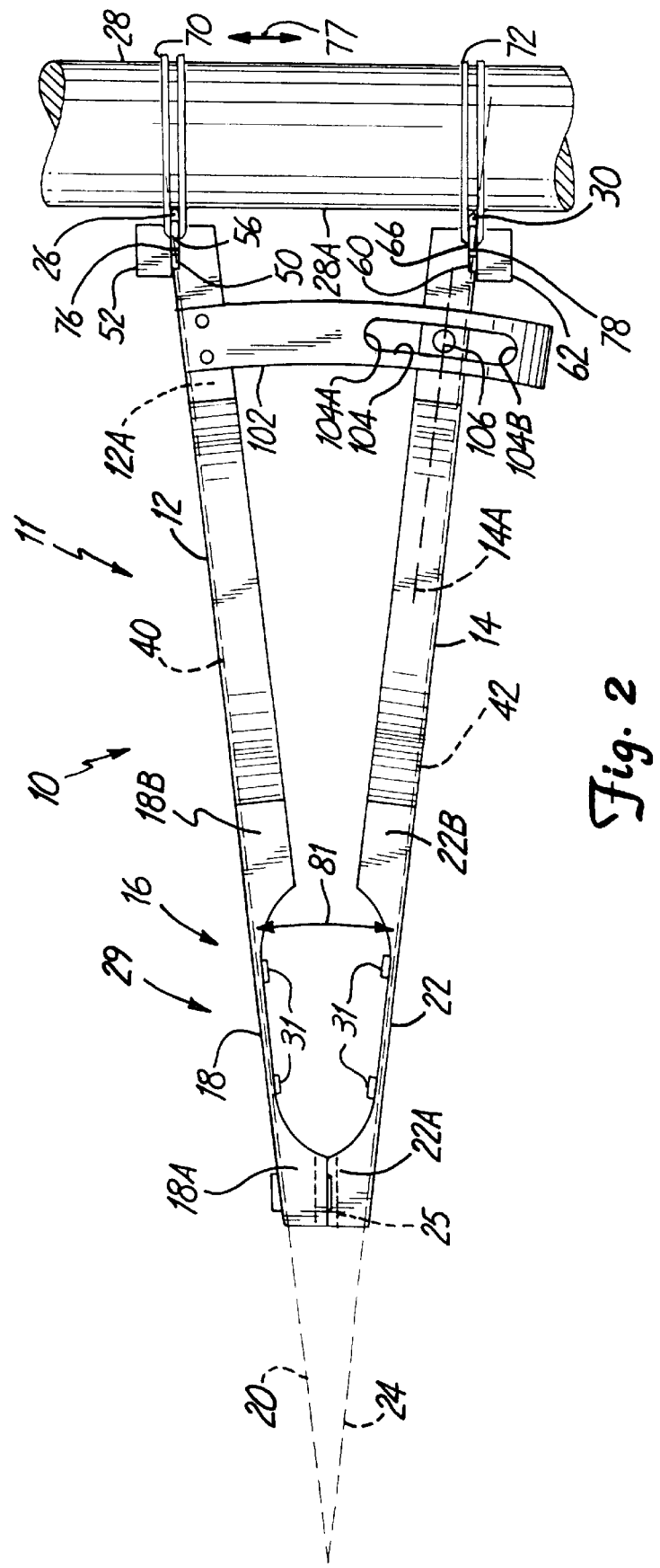
FIG. 2 is a side elevational view of the extensometer of FIG. 1.

A first embodiment of an extensometer of the present invention is illustrated in FIGS. 1 and 2 at 10. The extensometer 10 includes an extensometer structure 11 of the present invention comprising a first extension arm 12 and a second extension arm 14 connected together by a flexure assembly 16. The flexure assembly 16 includes a first flexure 18 defining a first plane 20 and a second flexure 22 defining a second plane 24. As best illustrated in FIG. 2, the first flexure 18 and the second flexure 22 are coupled together at ends 18A and 22A, such that the first plane 20 intersects with the second plane 24. The first extension arm 12 is joined to the first flexure 18 on an end 18B. The first extension arm 12 includes a first tip 26 engageable with a test specimen indicated at 28 (FIG. 2). The second extension arm 14 is joined to the second flexure 22 on an end 22B. The second extension arm 14 includes a second tip 30 engageable with the test specimen 28. A sensing device 29, herein illustrated as a plurality of strain gauges 31, provides a signal representative of a change in distance between the tips 26 and 30 to a suitable display or recorder, not shown.

Orientation of the first flexure 18 and the second flexure 22 such that the first plane 20 and the second plane 24 intersect stiffens the extensometer 10, thus giving the extensometer 10 a high natural frequency when it is mounted to the test specimen 28. In particular, longitudinal forces acting upon the tips 26 and 30 parallel to longitudinal axes 12A and 14A of the extension arms 12 and 14, respectively, do not cause the first flexure 18 or the second flexure 22 to bend, but rather, induce substantially only tension and compression in the first flexure 18 and the second flexure 22. Referring to FIG. 2, a line of force 40 extends from the first tip 26 and is preferably in the first plane 20 extending through the first flexure 18 and the first extension arm 12. Similarly, a second line of force 42 extends from the second tip 30 and is preferably in the second plane 24 extending through the second flexure 22 and the second extension arm 14.

Referring to FIG. 1, the first tip 26 is disposed on a knife-edge blade 50, typically used in the art, that is held in place on the first extension arm 12 with a holder or cap 52. The cap 52 is fastened with cap screws 54. The cap 52 further clamps a small wire clip 56 in place on the first extension arm 12. The second tip 30 is also disposed on a knife-edge blade 60 that is held on the second extension arm 14 with a cap 62 and cap screws 64. A wire clip 66 is positioned proximate the second tip 30 and is identical to the wire clip 56.

The knife-edge blades 50 and 60 are held in engagement with the test specimen 28 through the use of elastic or rubber bands 70 and 72, respectively, which are hooked over the opposite ears of the wire clips 56 and 66, respectively. The elastic bands 70 and 72 urge the tips 26 and 30 against the test specimen 28 such that when the test specimen 28 is strained in tension or compression, the first extension arm 12 and the second extension arm 14 will separate or move toward each other, respectively.

The knife-edge blades 50 and 60 are mounted on recessed surfaces 76 and 78 of the extension arms 12 and 14, respectively. The recessed surfaces 76 and 78 are formed on the extension arms 12 and 14 such that they are substantially perpendicular to an outer surface 28A of the test specimen 28 and in order that the lines of force 40 and 42 extend through the flexures 18 and 22.

The extensometer 10 is particularly well suited for measuring the change in distance of portions of the test specimen 28 when the test specimen 28 undergoes cyclic displacement as indicated by double arrow 77. Like the test specimen 28, the extensometer 10 will also undergo cyclic displacement. With mass present at the ends 18A and 22A, acceleration from the cyclic displacement of the ends 18A and 22A generates corresponding forces in a direction parallel to double arrow 77. However, due to the geometric configuration of the flexure assembly 16 and the location of the tips 26 and 30 on the extension arms 12 and 14, the forces present at the ends 18A and 22A are substantially reacted through the extension arms 12 and 14 to the tips 26 and 30 along the lines of force 40 and 42 as tension and compression in the flexures 18 and 22. In the embodiment illustrated, the flexures 18 and 22 in the relaxed state form an angle indicated by double arrow 81 approximately equal to 14 degrees. A preferred range for the angle 81 is approximately 5 to 40 degrees. A further preferred range is approximately 10 to 20 degrees.

Another aspect of the present invention includes a stop assembly 100 coupled to the first extension arm 12 and the second extension arm 14. The stop assembly 100 prevents overbending of the first flexure 18 or the second flexure 22. The stop assembly 100 includes a plate 102 joined to the first extension arm 12. The plate 102 extends toward the second extension arm 14 and includes an arcuate slot 104. A pin 106 is joined to the second extension arm 14 and extends into the arcuate slot 104. Under normal operation, the pin 106 freely moves within the slot 104 without contacting any portion of the plate 102. However, if the extension arms 12 and 14 are brought either too close to each other, or too far from each other, the pin 106 will contact the plate 102 at opposite ends 104A and 104B of the arcuate slot 104, respectively.

In a preferred embodiment, the stop assembly 100 further includes a second plate 108 joined to the first extension arm 12, also having an arcuate slot 110. The second plate 108 is disposed on a side of the extension arms 12 and 14 opposite the first plate 102. A second pin 112 illustrated in FIG. 5 extends from the second extension arm 14 and extends into the arcuate slot 110. Use of the first plate 102 and the second plate 108 limits lateral displacement of the extension arms 12 and 14 in opposite directions. As illustrated in FIG. 1, the first plate 102 and the second plate 108 can be integrally formed together with a connecting portion 109 to form a U-shaped structure.

Figure 3:
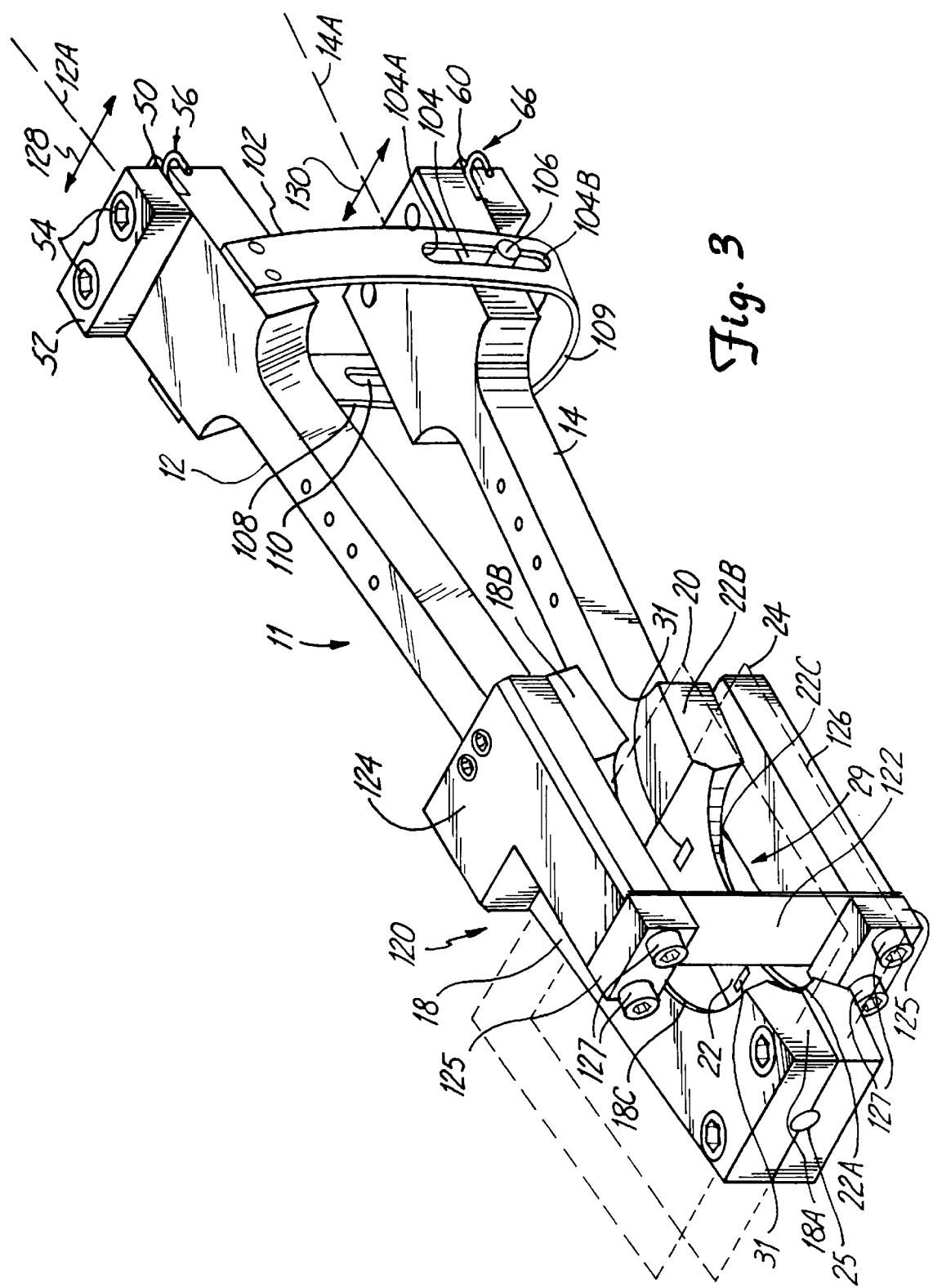
FIG. 3 is a perspective view of the extensometer of FIG. 1 with a first embodiment of a bracing flexure assembly.

Another aspect of the present invention includes a bracing flexure assembly 120 that stabilizes the extension arms 12 and 14 and is illustrated in FIGS. 3, 4 and 5. The bracing flexure assembly 120 includes a bracing flexure 122 coupled to the first extension arm 12 with a support arm 124. A second support arm 126 couples the bracing flexure 122 to the second extension arm 14. In the embodiment illustrated, caps 125 and fasteners 127 secure the bracing flexure 122 to the support arms 124 and 126. The bracing flexure 122 is flexible and bends easily, offering little resistance to movement of the extension arms 12 and 14 and tips 26 and 30 toward and away from each other. However, the bracing flexure 122 is substantially rigid for movements of the extension arms 12 and 14 laterally in opposite directions, illustrated by double arrows 128 and 130, as well as twisting movements of the extension arms 12 and 14 about each respective longitudinal axis 12A and 14A.

The bracing flexure 122 is disposed on one side of the extensometer 10 and defines a plane that extends through the first plane 20 and the second plane 24. In the embodiment illustrated, notches or recesses 18C and 22C are provided to reduce the width of the extensometer 10. In order to provide a low "activation force", which is the minimum force required between the tips 26 and 30 to deflect the flexures 18 and 22 and thereby provide an output signal from the sensing device 29, the bracing flexure 122 extends approximately through a point of inflection of the first flexure 18 and the second flexure 22. Due to the geometry of the flexure assembly 16, the point of inflection for the first flexure 18 and the second flexure 22 is approximately ⅓ to ½ the length of the first flexure 18 from the first end 18A, and ⅓ to ½ the length of the second flexure 22 from the second end 22A.

As appreciated by those skilled in the art, a second bracing flexure assembly can be disposed on a side of the extensometer 10 opposite the bracing flexure assembly 120. If desired, the bracing flexures of these parallel bracing flexure assemblies can be formed as a single unitary element having an aperture through which the extension arms 12 and 14 can extend.

The first flexure 18, the second flexure 22, the first extension arm 12 and the second extension arm 14 can be integrally formed as a single unitary piece. Alternatively, as illustrated, the first flexure 18 is integrally formed with the first extension arm 12, and the second flexure 22 is integrally formed with the second extension arm 14. In the embodiment illustrated, a channel 25 is formed between the ends 18A and 22A when the ends 18A and 22A are joined. The end 18A and 22A can be used to clamp and secure signal wires connected to the strain gauges 31 in place wherein the signals wires pass through the channel 25.

Figure 6A:
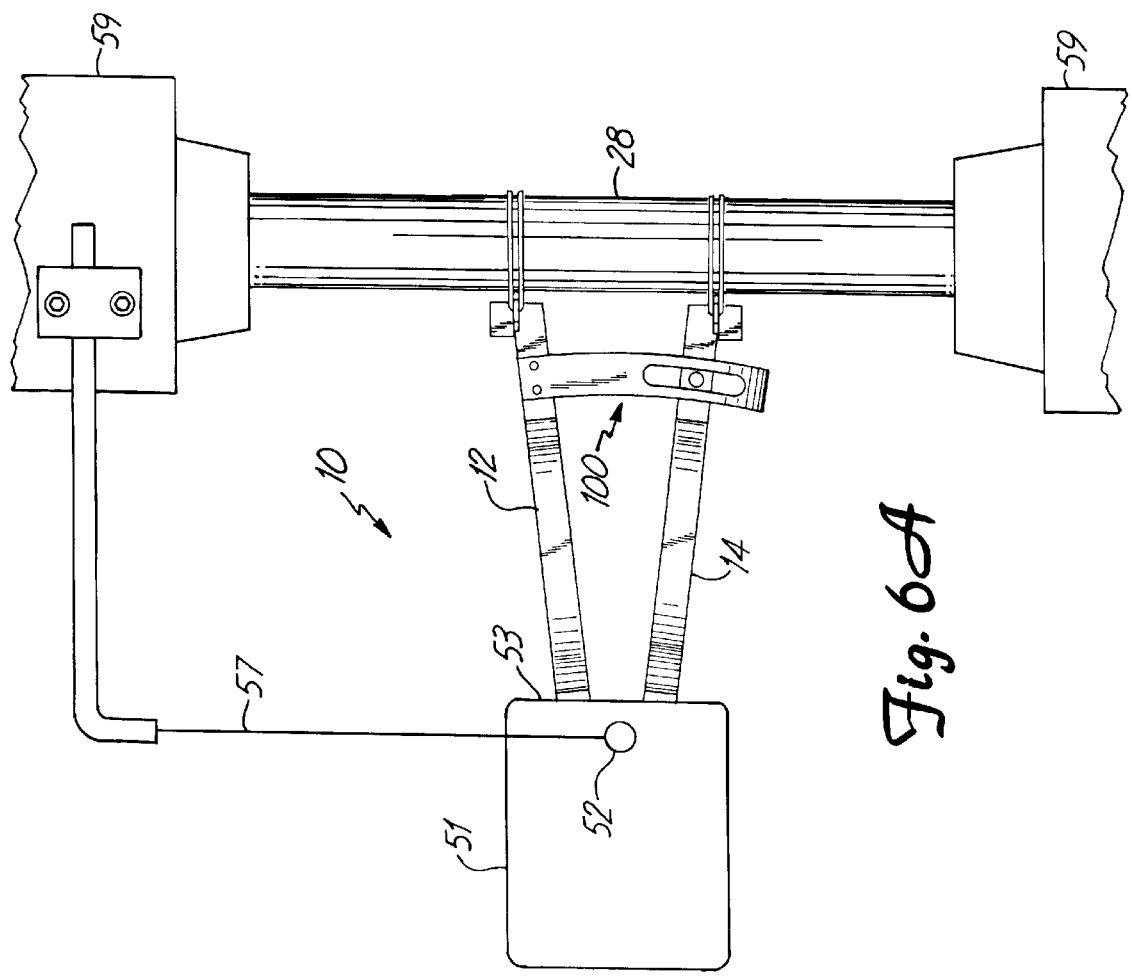
FIG. 6A is a side elevational view of the extensometer of FIG. 6 on a test specimen.

In FIG. 6, a housing 51 is provided to protect the flexure assembly 16. The housing 51 includes sidewalls 51A, 51B, 51C and 51D, and a rear wall 51E. The extension arms 12 and 14 extend through an opening 53. The housing 51 is secured to the flexure assembly 16, preferably, with the rear wall 51E secured to the ends 18A and 22A. In this manner, both of the extension arms 12 and 14 can move relative to the housing 51. This construction is particularly useful when it is not possible or impractical to completely support the extensometer 10 on the test specimen 28 using only the elastic bands 70 and 72. Rather, the extensometer 10 can be supported by the housing 51. Referring to FIG. 6A, suitable supports 52 are provided on the housing 51 and attached to flexible wires or rods indicated at 57 that are coupled to another portion of the test specimen 28, or to end couplers 59 used to support the test specimen 28 in a test machine, not shown. The extensometer 10 can then move with the test specimen 28 during testing, but still measure elongation or compression of the portion of the test specimen 28. Preferably, the supports 52 are located at substantially the center of gravity of the extensometer 10, represented in FIG. 6 at 61, in order to minimize contact pressure of the tips 26 and 30 on the test specimen 28.

Figure 7:
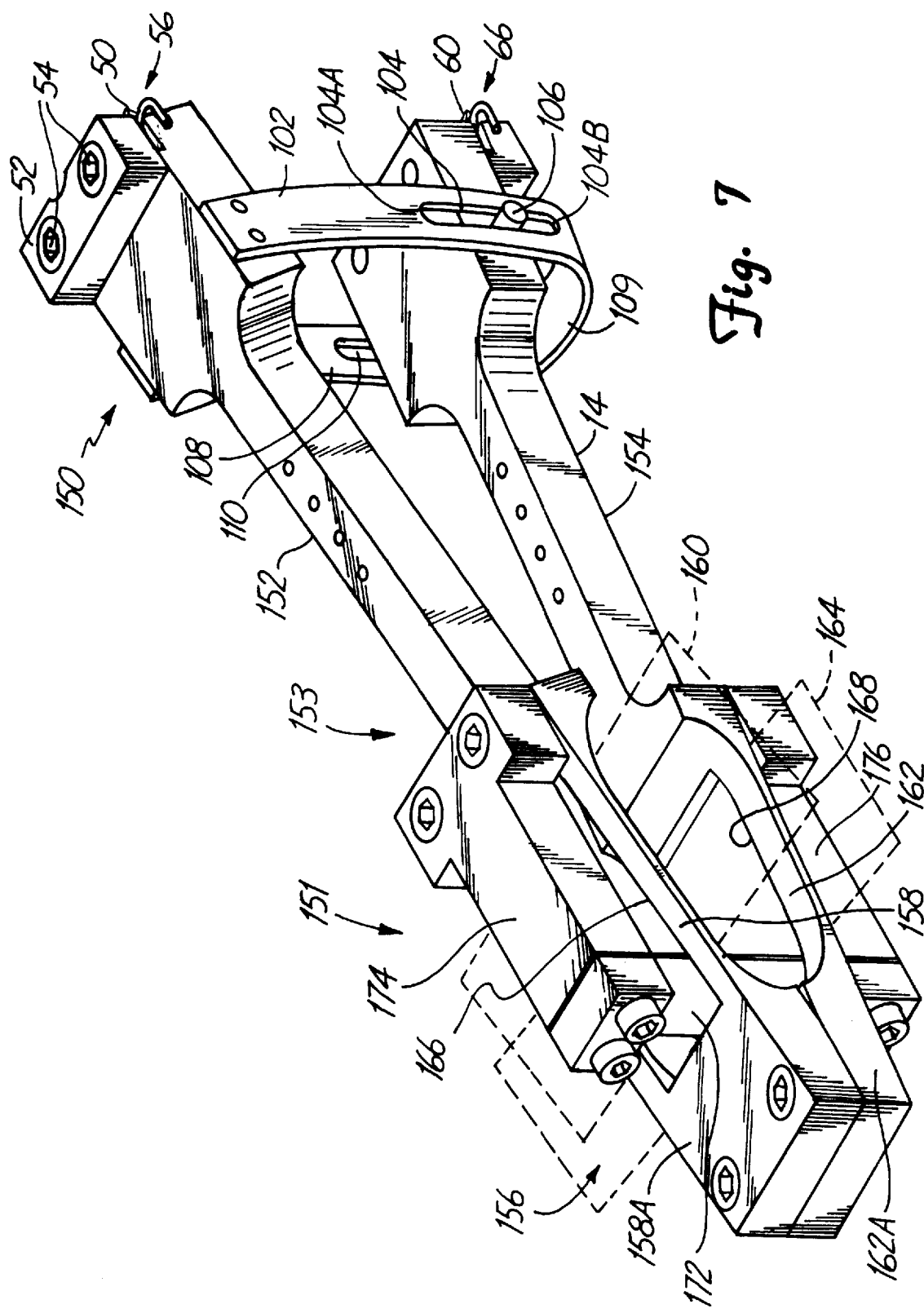
FIG. 7 is a perspective view of a second embodiment of an extensometer of the present invention with a second embodiment of a bracing flexure assembly.

FIGS. 7 and 8 illustrate a second embodiment of an extensometer of the present invention at 150 and a second embodiment of a bracing flexure assembly generally at 151. The extensometer 150 is substantially similar to the extensometer 10 described above. An extensometer structure 153 includes a first extension arm 152 and a second extension arm 154 connected together by a flexure assembly 156. The flexure assembly 156 includes a first flexure 158 defining a first plane 160 and a second flexure 162 defining a second plane 164. The first flexure 158 and the second flexure 162 are coupled together at ends 158A and 162A such that the first plane 160 intersects with the second plane 164 in a manner similar to the extensometer 10. In this embodiment, the first flexure 158 includes an aperture 166 and the second flexure 162 includes an aperture 168. The bracing flexure assembly 151 is coupled to the first extension arm 152 and the second extension arm 154 such that a bracing flexure 172 extends through the apertures 166 and 168. A support arm 174 couples the bracing flexure 172 to the first extension arm 152, while a second support arm 176 couples the bracing flexure 172 to the second extension arm 154.

Figure 9:
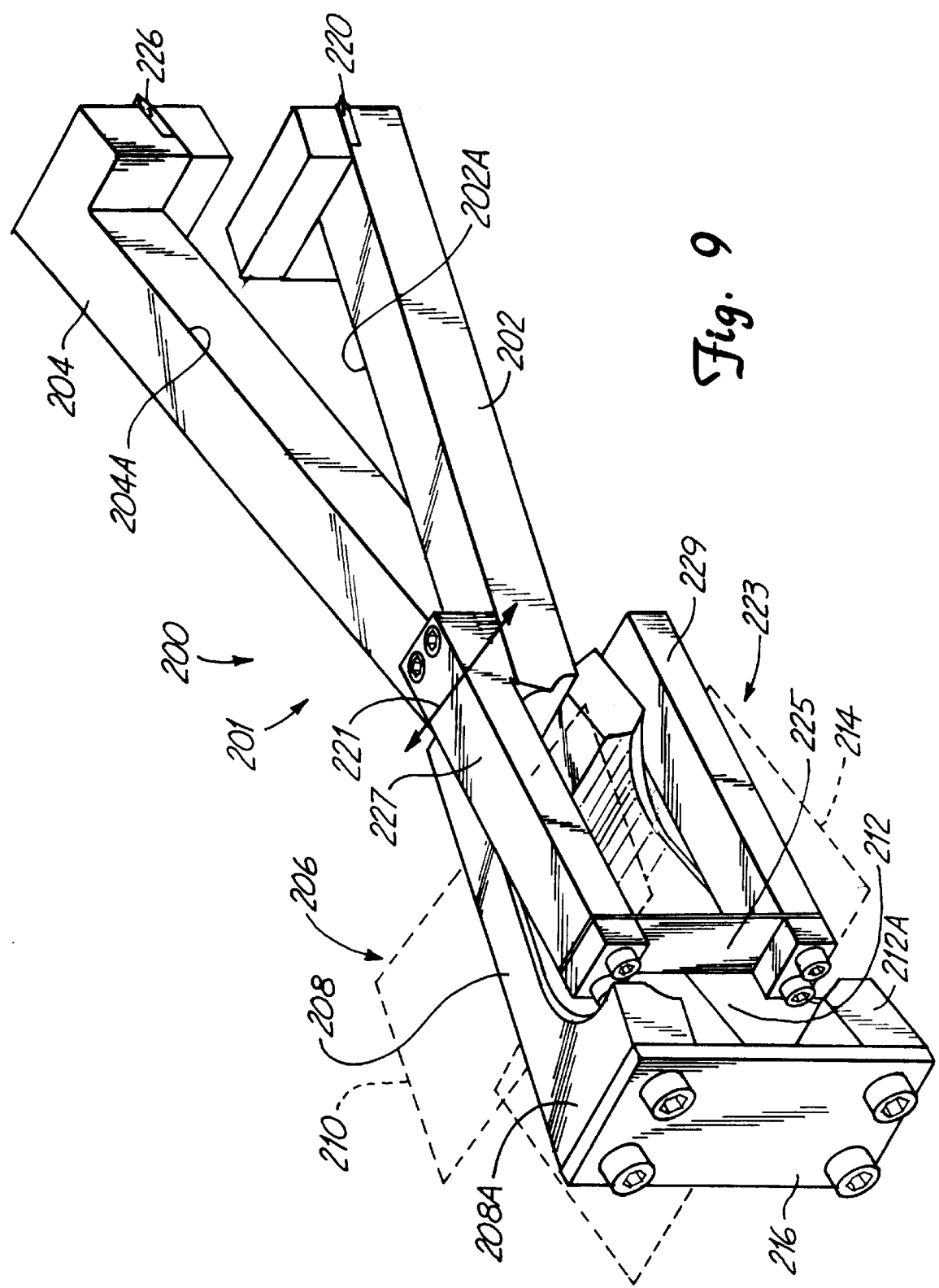
FIG. 9 is a perspective view of a third embodiment of an extensometer and a third embodiment of a bracing flexure assembly of the present invention.
Figure 10:
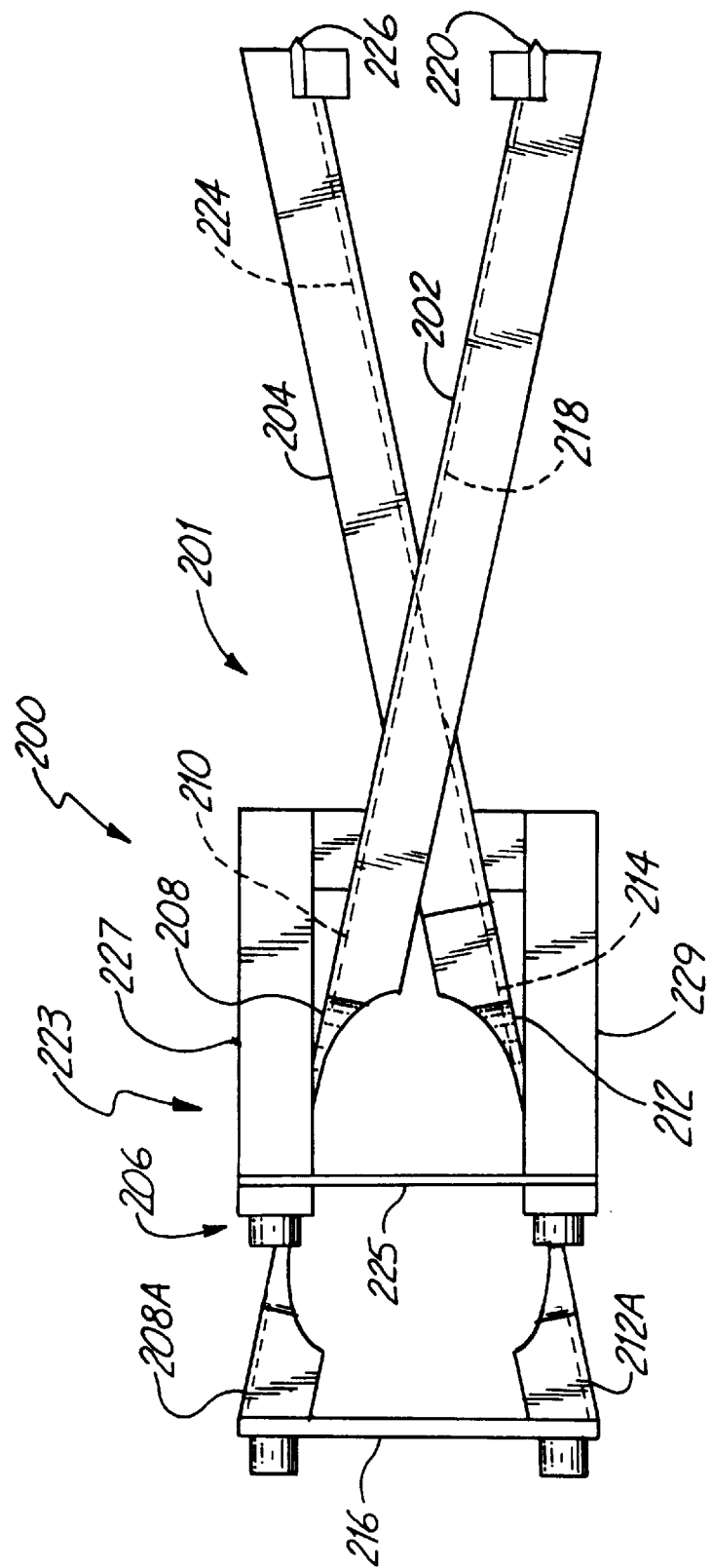
FIG. 10 is a side elevational view of the extensometer and the bracing flexure assembly of FIG. 9.

A third embodiment of an extensometer of the present invention is illustrated in FIGS. 9, 10 and 11 at 200. The extensometer 200 includes an extensometer structure 201 having a first extension arm 202 and a second extension arm 204 connected together by a flexure assembly 206. The flexure assembly 206 includes a first flexure 208 defining a first plane 210 and a second flexure 212 defining a second plane 214. As illustrated, the first flexure 208 and the second flexure 212 are coupled to together at ends 208A and 212A, respectively, with a rigid support bar 216. In this embodiment, the first plane 210 intersects with the second plane 214 forward of the flexures 208 and 212 rather than rearward of the flexures 18 and 22, as shown in the extensometer 10 and 150 in FIGS. 1–8. In a preferred embodiment, a line of force 218 extends from a first tip 220 in the first plane 210 and through the first flexure 208 and through the first extension arm 202. Similarly, a second line of force 224 extends from a second tip 226 in the second plane 214 and through the second flexure 212 and through the second extension arm 204. Each of the extension arms 202 and 204 include notches 202A and 204A (FIG. 11), respectively. In this manner, the extension arms 202 and 204 can be positioned closer to each other in order to reduce a width indicated by double arrow 221 of the extensometer 200. As appreciated by those skilled in the art, if desired, one of the extension arms 202 or 204 could include an aperture through which the other extension arm would extend through.

A bracing flexure assembly 223, similar to the bracing flexure assembly 120 described above, is joined to the extension arms 202 and 204 to inhibit lateral movement of the extension arms 202 and 204 and twisting motion of the extension arms 202 and 204 along each respective longitudinal axis. The bracing flexure assembly 223 includes a bracing flexure 225 coupled to the extension arm 202 with a support arm 227 and coupled to the extension arm 204 with a support arm 229. In a preferred embodiment, the bracing flexure 225 extends through the first plane 210 and the second plane 214 at the point of inflection of the first flexure 208 and the second flexure 212.

FIGS. 12, 13 and 14 illustrate the extensometer 10, described above, with a fourth embodiment of a bracing flexure assembly 230. The bracing flexure assembly 230 includes a U-shaped bracing flexure 232 having ends 232A and 232B. The end 232A is coupled to the first extension arm 12 with a support block 234. The second end 232B of the bracing flexure 232 is coupled to the second extension 14 arm with a support block 236. The bracing flexure 232 is substantially compliant for movement of the tips 26 and 30 toward or away from each other. However, the bracing flexure 232 is substantially rigid for displacement of the tips 26 and 30 parallel to each respective longitudinal axis 12A and 14A in opposite directions as illustrated, for example, by arrow 240 and arrow 242. The bracing flexure 232 also inhibits twisting of the extension arms 12 and 14 about each respective longitudinal axis 12A and 14A. The bracing flexure 232 also provides some resistance to lateral displacement of the tips 26 and 30 indicated by arrows 128 and 130 (FIG. 14); however, the flexure assembly 120 is better suited to resist these forces.

Referring back to FIGS. 1–3, the strain gauges 31 disposed on the first flexure 18, and the strain gauges 31 disposed on the second flexure 22 are connected in conventional Wheatstone bridges as is known in the art to provide a signal indicative of the change in distance between the tips 26 and 30.

An alternative arrangement of strain sensors is illustrated in FIGS. 12–13 by a second plurality of strain gauges comprising gauges 233A and 233B on opposite surfaces of the first flexure 18, and gauges 233C and 233D on opposite surfaces of the second flexure 22. The strain gauges 233A and 233B are secured to the first flexure 18 at approximately ⅓ to ½ the length of the first flexure 18 from the first end 18A. Similarly, the strain gauges 233C and 233D are secured to the second flexure 22 at approximately ⅓ to ½ the length of the second flexure 22 from the second end 22A.

The second plurality of strain gauges 233A–233D are connected in a Wheatstone bridge 235 as illustrated in FIG. 15 where excitation is provided across nodes 237A and 237B and an output signal indicative of the change in distance between the tips is obtained across nodes 239A and 239B. Of course, the second plurality of strain gauges 233A–233D, or structural equivalents, can be used on each of the extensometer described above.

Other known sensing devices can also be used. Referring to FIG. 16, a capacitive sensor 250 is provided between the first extension arm 12 and the second extension arm 14. The capacitive sensor 250 includes a first support 252 joined to the first extension arm 12 and a second support 254 joined to the second extension arm 14. Each support 252 and 254 includes a curved capacitive plate 256 and 258, respectively. The capacitance of the capacitive sensor 250 varies, depending on the overlap of the capacitive plates 256 and 258 in order to provide a signal indicative of the change in distance between the tips 26 and 30. Other forms of capacitive sensors such as known variable gap capacitive sensors can also be used.

Although the present invention has been described with reference to preferred embodiments, workers skilled in the art will recognize that changes may be made in form and detail without departing from the spirit and scope of the invention.

What is claimed is:

1. An extensometer structure for an extensometer comprising:
    a flexure assembly comprising:
        a first flexure defining a first plane; and
        a second flexure defining a second plane, the second flexure being coupled to the first flexure wherein the first and second planes intersect;
    a first extension arm joined to the first flexure having a first tip engageable with a test specimen wherein a line of force from the first tip extends parallel to the first plane; and
    a second extension arm joined to the second flexure having a second tip engageable with the test specimen wherein a line of force from the second tip extends parallel to the second plane.

2. The apparatus of claim 1 and further comprising sensing means for providing an output signal indicative of a change in distance between the first tip and the second tip.

3. The apparatus of claim 1 wherein the line of force from the first tip extends through the first flexure, and wherein the line of force from the second tip extends through the second flexure.

4. The apparatus of claim 3 wherein the line of force from the first tip is disposed in the first plane, and wherein the line of force from the second tip is disposed in the second plane.

5. The apparatus of claim 3 wherein the line of force from the first tip extends through the first extension arm from the first tip to the first flexure, and wherein the line of force from the second tip extends through the second extension arm from the second tip to the second flexure.

6. The apparatus of claim 1 and a bracing flexure coupled to the first extension arm and the second extension arm.

7. The apparatus of claim 6 wherein the bracing flexure extends through the first plane and the second plane.

8. The apparatus of claim 7 wherein the bracing flexure extends through the first plane within a length of the first flexure, and wherein the bracing flexure extends through the second plane within a length of the second flexure.

9. The apparatus of claim 8 wherein the bracing flexure extends approximately through a point of inflection of the first flexure and the second flexure.

10. The apparatus of claim 8 wherein the bracing flexure is disposed within approximately ⅓ to ½ of the length of the first flexure from an end of the first flexure farthest from the first tip.

11. The apparatus of claim 10 wherein the bracing flexure is disposed within approximately ⅓ to ½ of the length of the second flexure from an end of the second flexure farthest from the second tip.

12. The apparatus of claim 8 wherein the bracing flexure is disposed on one side of the first flexure and the second flexure.

13. The apparatus of claim 8 wherein the bracing flexure extends through the first flexure and the second flexure.

14. The apparatus of claim 6 wherein the bracing flexure is disposed between the first flexure and the second flexure.

15. The apparatus of claim 14 wherein the bracing flexure includes a first end and a second end positioned adjacent each other, the first end being coupled to the first extension arm and the second end being coupled to the second extension arm.

16. The apparatus of claim 2 wherein the sensing means comprises a plurality of strain gages coupled to the first flexure and the second flexure.

17. An extensometer for measuring a change in distance between two points on a surface of a test specimen, the extensometer comprising:
    a flexure assembly comprising:
        a first flexure defining a first plane; and
        a second flexure defining a second plane, the second flexure being coupled to the first flexure wherein the first and second planes intersect;
    a first extension arm joined to the first flexure having a first tip engageable with the test specimen;
    a second extension arm joined to the second flexure having a second tip engageable with the test specimen;
    a bracing flexure coupled to the first extension arm and the second extension arm; and
    sensing means for providing an output signal indicative of a change in distance between the first tip and the second tip.

18. The extensometer of claim 17 wherein the bracing flexure extends through the first plane and the second plane.

19. The extensometer of claim 18 wherein the bracing flexure extends through the first plane within a length of the first flexure, and wherein the bracing flexure extends through the second plane within a length of the second flexure.

20. The extensometer of claim 19 wherein the bracing flexure is disposed within approximately ⅓ and ½ of the length of the first flexure from an end of the first flexure farthest from the first tip.

21. The extensometer of claim 20 wherein the bracing flexure is disposed within approximately ⅓ to ½ of the length of the second flexure from an end of the second flexure farthest from the second tip.

22. The extensometer of claim 19 wherein the bracing flexure is disposed on one side of the first flexure and the second flexure.

23. The extensometer of claim 19 wherein the bracing flexure extends through the first flexure and the second flexure.

24. The extensometer of claim 17 wherein the bracing flexure is disposed between the first flexure and the second flexure.

25. The extensometer of claim 24 wherein the bracing flexure includes a first end and a second end positioned adjacent each other, the first end being coupled to the first extension arm and the second end being coupled to the second extension arm.

26. The extensometer of claim 17 wherein the sensing means comprises a plurality of strain gages coupled to the first flexure and the second flexure.

27. The extensometer of claim 17 and a stop assembly coupled to the first extension arm and the second extension arm, the stop assembly comprising:
    a plate joined to the first extension arm, wherein the plate includes an arcuate slot; and
    a pin joined to the second extension arm and extending into the arcuate slot.

28. The extensometer of claim 27 wherein the first-mentioned plate is disposed on a side of the first extension arm, and wherein the stop assembly further comprises:
   a second plate joined to the first extension arm on a side opposite the first-mentioned plate, wherein the second plate includes a second arcuate slot; and
   a second pin joined to the second extension arm and extending into the second arcuate slot.

29. An extensometer for measuring a change in distance between two points on a surface of a test specimen, the extensometer comprising:
   a flexure assembly comprising:
      a first flexure defining a first plane; and
      a second flexure defining a second plane, the second flexure being coupled to the first flexure wherein the first and second planes intersect;
   a first extension arm joined to the first flexure having a first tip engageable with the test specimen;
   a second extension arm joined to the second flexure having a second tip engageable with the test specimen;
   a stop assembly coupled to the first extension arm and the second extension arm, the stop assembly comprising:
      a plate joined to the first extension arm, wherein the plate includes an arcuate slot; and
      a pin joined to the second extension arm and extending into the arcuate slot; and
   sensing means for providing an output signal indicative of a change in distance between the first tip and the second tip.

30. The extensometer of claim 29 wherein the first-mentioned plate is disposed on a side of the first extension arm, and wherein the stop assembly further comprises:
   a second plate joined to the first extension arm on a side opposite the first-mentioned plate, wherein the second plate includes a second arcuate slot; and
   a second pin joined to the second extension arm and extending into the second arcuate slot.

31. The extensometer of claim 30 and a connecting member joining a remote end of the first-mentioned plate to a remote end of the second plate to form a U-shaped structure.

* * * * *

UNITED STATES PATENT AND TRADEMARK OFFICE
CERTIFICATE OF CORRECTION

PATENT NO. : 5,819,428
DATED : October 13, 1998
INVENTOR(S) : Meyer

It is certified that error appears in the above-identified patent and that said Letters Patent is hereby corrected as shown below:

On the title page,

Item [56]   References Cited

U.S. PATENT DOCUMENTS

Delete -- 289,203   4/1928   GBX --

Insert

--FOREIGN PATENT DOCUMENTS

--289,203   4/1883   GBX--

Signed and Sealed this

Fourth Day of May, 1999

Attest:

Attesting Officer

Q. TODD DICKINSON

Acting Commissioner of Patents and Trademarks